March 24, 1959 — H. TUTHILL — 2,878,726
AIRCRAFT MIRROR
Filed Nov. 29, 1957
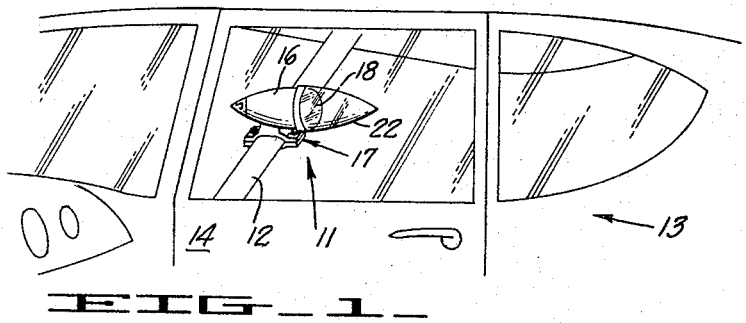
FIG_1_
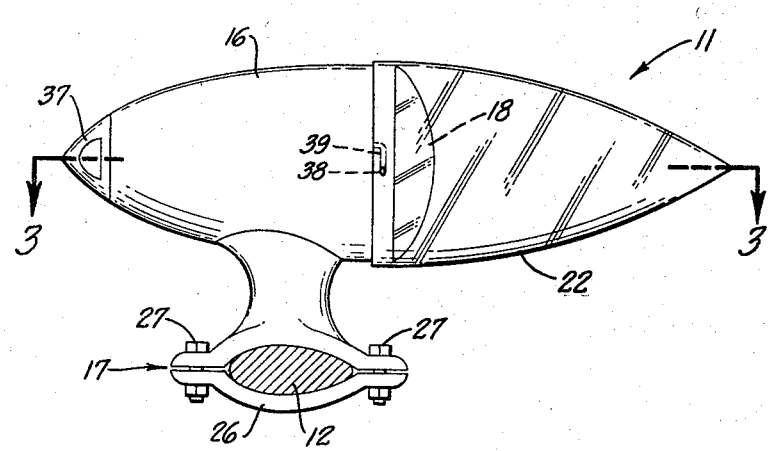
FIG_2_
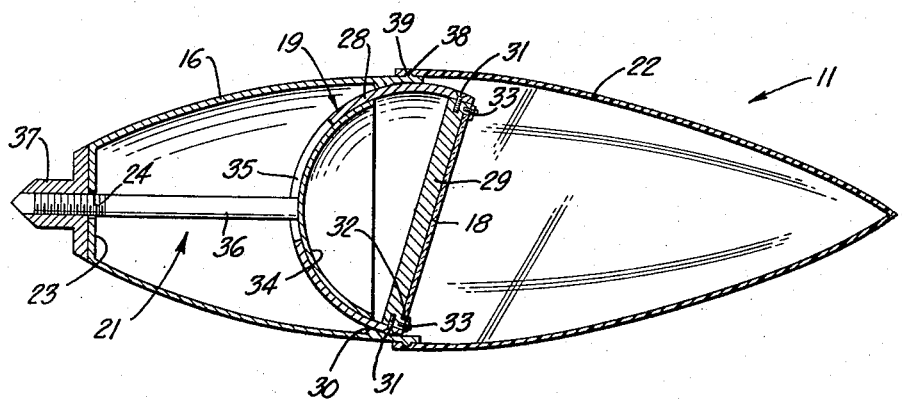
FIG_3_
INVENTOR.
Herbert Tuthill
BY
William D. Hager
ATTORNEY

2,878,726

AIRCRAFT MIRROR

Herbert Tuthill, Nogales, Ariz.

Application November 29, 1957, Serial No. 699,732

6 Claims. (Cl. 88—98)

The present invention relates to aircraft mirrors in general, and more particularly, to such a mirror which when mounted exteriorly of the aircraft creates a minimum of drag and will not deviate from an adjustable preset reflecting position.

Mirrors are extensively employed at appropriate locations on aircraft to enable the pilot to readily observe various portions of the craft and surrounding space which would otherwise be obscured from the pilot's normal forward line of vision. For example, it is often desirable that a mirror be suitably mounted to simultaneously reflect the landing gear of the craft and the landing surface. Such a mirror enables the pilot, without diversion from his normal forward line of vision, to determine the position of the landing gear with respect to the ground. Also, in the case of retractable landing gear, the mirror facilitates observation of the position of the landing gear at all times, thereby minimizing the hazard of landing the aircraft with the gear retracted.

Another important use for mirrors in aircraft is to provide the pilot with means for observing the lateral and rearward air space surrounding his craft as well as the trailing extremities thereof. In aircraft, as in automobiles, such rear or side view mirrors are material to the safe operation of same in permitting the pilot or operator to observe his position relative to other craft or vehicles which may be in the vicinity. In the operation of aircraft, the pilot can thereby directly determine whether a turn, or other maneuver, such as taxiing on the ground, can be safely executed in his particular surroundings.

In general, aircraft mirrors which are currently in use are arranged to be continuously adjustable through a variety of reflecting positions from within the cockpit. Such mirrors are accordingly cumbersome for rapid manipulation into a desired reflecting position and, once in position, are difficult to maintain in adjustment. The mirrors are generally flat, circular discs oriented transverse to the direction of motion of the aircraft and accordingly, as is well known, such a mirror cross section in the moving air stream causes considerable drag force to be exerted thereon. The drag force not only tends to alter the adjustment of such a mirror from a fixed or locked reflecting position, but, in addition, poses attendant problems in the overall aerodynamics of the craft.

Considerable advantage is therefore to be gained in the provision of an aircraft mirror which is streamlined commensurate with minimum drag in an air stream moving at the average cruising velocity of the craft with which it is employed. Additional advantages result where the mirror can be adjusted and reliably locked in any desired reflecting position prior to take-off to remain in fixed position during the entire course of a flight.

The present invention provides a mirror having the above noted capabilities as well as other advantages and hence overcomes many of the limitations and inadequacies of known aircraft mirrors. The present invention accomplishes the foregoing by providing an aircraft mirror which generally includes a body member which is adapted for mounting on aircraft and streamlined for minimum drag at the usual cruising speed of the particular craft with which it is employed. A ball joint is carried by the body member for pivotally rotating a reflecting surface substantially transverse thereto. The reflecting surface is accordingly hand-adjustable to substantially any desired reflecting position. The reflecting surface can be secured in the desired reflecting position by releasable locking means carried by the body member and engaging the ball joint. In addition, a transparent hood element is detachably secured coaxially to the body element in enclosing relationship with the reflecting surface. Moreover, the hood element is appropriately streamlined to produce minimum drag at the cruising speed of the aircraft. The hood element consequently permits observation of the reflecting surface while eliminating air resistance due to eddy currents of air which would otherwise be generated at the trailing portions of the reflecting surface.

It is therefore an object of the present invention to provide an improved mirror for use in aircraft as well as other vehicles wherein it becomes desirable that the resistance of the mirror to a moving stream of air be reduced to a minimum.

Another object of this invention is the provision of a streamlined aircraft mirror which is readily adjustable to desired reflecting positions and which may be rigidly locked in any such position prior to take-off.

A specific object of the present invention is to provide a rear view mirror for external mounting upon light aircraft and which is streamlined to produce minimum drag at average cruising speeds of such class of craft.

A further object of the invention is the provision of a device of the class described above wherein a reflecting surface is pivotally and lockably secured to a blunt-nosed streamlining body member and is enclosed by a transparent, closed boat-tailed streamlining hood element.

Additional objects and advantages of the invention will become apparent by reference to the following description taken in conjunction with the accompanying drawing wherein:

Figure 1 is a schematic illustration of a preferred embodiment of the present invention specifically adapted as a rear view mirror for attachment to a wing supporting strut member of a high-winged light aircraft, Figure 2 is a side elevational view of the specific embodiment of Figure 1, and Figure 3 is an enlarged cross sectional view of this embodiment taken along the line 3—3 of Figure 2.

Considering now the invention in some detail and referring to the preferred form thereof illustrated in the drawing, there is provided an aircraft mirror which is specifically embodied as a rear view mirror 11 (see Figure 1) for attachment to wing supporting strut 12 of a high wing light aircraft 13. Mirror 11 when mounted at the foregoing location is readily observable from a position within the cockpit 14 of aircraft 13. Moreover, the mirror enables a pilot from his position within cockpit 14 to ascertain his side and rearward surroundings without diversion from his normal forward line of vision. It will be appreciated, however, that the mirror of the present invention may be variously mounted on the aircraft at locations other than that specified above. For example, the mirror may be attached to the forward lower portions of the fuselage in viewing relationship with the landing gear. Therefore the invention is not restricted to the rear view mirror embodied herein and accordingly no limitations are intended or to be inferred therefrom, reference being made to the appended claims for a precise delineation of the scope of the invention.

Considering now rear view mirror 11 in more detail with particular emphasis on the preferred structure thereof and referring to Figures 2 and 3 of the drawing, it will be noted that such mirror generally includes a streamlined body member 16 having mounting means 17 to facilitate attachment to strut 12. A reflecting surface 18 is adjustably secured in substantially coaxial end attachment to body member 16 as by means of a ball joint 19 secured thereto (see Figure 3). Locking means 21 is carried by body member 16 in releasable engagement with ball joint 19 for fixing same in any desired position with respect to the body member. A streamlined transparent hood element 22 is detachably secured to body member 16 in coaxial enclosing relationship to reflecting surface 18 to prevent back pressures caused by eddy currents of air.

More specifically, body member 16 is provided as a hollow axially symmetric closed streamlining surface of revolution constructed of light weight structural material, such as aluminum. The specific configuration of the streamlining surface employed depends on the average cruising speed of the aircraft upon which the mirror is to be mounted. The streamlining surface is selected to produce minimum drag at such cruising speed. For light aircraft having cruising speeds in the general range of from 100 to 200 miles per hour, a blunt nosed surface of revolution, such as an ellipsoid as shown in the drawing, provides optimum performance characteristics. For purposes which are subsequently described, the closed leading end of the body member is truncated and formed with a flat transverse end closure 23 having a central axial aperture 24 therethrough.

As regards mounting means 17, it will be noted that such means may be of any suitable type to facilitate rigid mechanical attachment of body member 16 to the aircraft at any desired location. In the preferred embodiment, however, wherein the mirror is specifically adapted for attachment to wing strut 12, the mounting means preferably comprises a split ring clamp 26 exteriorly projecting from the surface of body member 16 and tightly clamping strut 12 by means of fasteners 27.

Considering now the ball joint 19 of previous mention, such joint advantageously comprises a hollow truncated hemispherical bearing member 28 having an outside diameter slightly greater than the inside diameter of a constriction 30 in the open end cross section of body member 16, member 28 being recessed coaxially therein. The outer hemispherical surface of member 28 consequently pivotally and rotatably engages the inner wall surface of constriction 30 in the open end of body member 16 with three degrees of freedom. Bearing member 28 is best constructed of light weight structural material, e.g., aluminum.

A circular mounting plate 29 is coaxially secured to the enlarged end of bearing member 28 to form an end closure therewith and to facilitate attachment of reflecting surface 18 to the ball joint. Plate 29 may be attached to bearing member 28 as by means of circumferentially spaced fasteners 31 extending radially through the bearing member and threadably engaging the plate. The exterior face of mounting plate 29 is preferably provided with a shallow central circular recess 32 within which reflecting surface 18 is advantageously secured flush with the surface of the plate. Reflecting surface 18 may then be secured within recess 32 by circumferentially spaced fasteners 33 attached to plate 29 and having heads overlapping the adjacent edge surface of the recessed reflecting surface. Reflecting surface 18 is conventionally a plane circular mirror surface of standard glass design, however, other mirror surfaces, e.g., parabolic, spherical, and the like, may also be employed as reflecting surface 18.

As regards the locking means 21 of previous mention for releasably locking ball joint 19 in any desired position with respect to body member 16, it is to be noted that such locking means is best provided as a hollow generally hemispherical shoe 34 concentrically and translatably secured within body member 16 in engagement with the inner surface of ball joint bearing member 28. More specifically, shoe 34 has an outer radius of curvature substantially equal to the inner radius of curvature of the bearing member and extends partially through the open truncated end 35 thereof. As in the case of body member 16 and bearing member 28, shoe 34 is advantageously constructed of light weight structural material, e.g., aluminum, in order to render the overall mirror as light weight as possible.

The means for translatably securing shoe 34 within body member 16 preferably comprises an axial tie rod 36 centrally attached to the shoe and extending in loose fitting relationship through aperture 24. Tie rod 36 threadably engages an adjusting nut 37 bearing against end closure 23 at the leading end of body member 16. Nut 37 is appropriately shaped to conform to the truncated apex of the streamlining configuration of the body member. The nut may be loosened or tightened to respectively release ball joint 19 for adjustment or to lock same in a desired position of adjustment. When nut 37 is loosely bearing against end closure 23, shoe 34 is in slideable contact with the interior surface of bearing member 28 and the peripheral surface thereof is slideable with respect to the adjacent interior engaging surfaces of body member 16. The generally hemispherical configuration of shoe 34 and the loose fit of tie rod 36 within aperture 24 thus permits pivotal rotation of bearing member 28 with three degrees of freedom while shoe 34 is at all times in uniform slideable engagement with the bearing member.

When the adjusting nut 37 is tightened against the end closure 23, shoe 34 is axially translated into intimate contact with the interior surface of bearing member 28. The outer peripheral surface of the bearing member is in turn brought into tight engagement with member 16. The bearing member is thus locked in any desired position of pivotal rotation within the end of body member 16 and reflecting surface 18 is correspondingly fixed in a desired reflecting position.

As regards hood element 22, such element is best provided as a hollow axially symmetrical closed streamlining surface of revolution fabricated from light weight transparent plastic material, such as, Plexiglas, Lucite, or the like, to permit unobscured vision of reflecting surface 18. As in the case of body member 16, the specific configuration of the streamlining surface is predicated by the average cruising speed of the craft with which the mirror of the present invention is to be employed. The streamlining surface is selected to eliminate eddy current back pressure at the particular cruising speed, and for light aircraft having cruising speeds in the range of from 100 to 200 miles per hour, a point tapered boat tail configuration as shown in the drawing is indicated for optimum performance. The hood element is releasably attached to body member 16 in coaxial enclosing relationship to reflecting surface 18. Any suitable means of mechanical attachment may be employed to secure the hood to the body member, as for example detents 38 projecting radially from the periphery of body member 16 and adapted to engage corresponding dents 39 formed in the inner wall surface of hood member 22. The above detent means facilitates rapid removal and attachment of the hood to the body member.

With the mirror of the present invention installed upon an aircraft, as by securing same to strut 12 with mounting means clamp 26, hood member 22 is first removed and adjusting nut 37 is loosened. A pilot may then observe mirror reflecting surface 18 from his normal position within cockpit 14 while an assistant adjusts the reflecting surface by pivotally rotating ball joint bearing member 28 within body member 16 until the reflecting surface is in a position that meets with the pilot's approval. Adjusting nut 37 is now tightly fastened against end closure 23, thus locking reflecting surface 18 in the desired deflecting position by virtue of shoe 34 bearing intimately against the interior surface of bearing member 28 as previously described. Hood member 22 is next attached to body member 18, as by forcing the hood member coaxially over the end of the body member until detents 38 engage dents 39. With the foregoing accomplished, mirror reflecting surface 18 will remain locked in the desired deflecting position during the course of a flight and the mirror as a whole will produce minimum drag by virtue of the streamlining surfaces of body member 16 and hood element 22. It will be appreciated, however, that in the event the mirror is oriented in a direction opposite to that depicted in Figure 1 (viz., with hood element 22 in a leading position and body member 16 in trailing position) the streamlining configurations of the hood and body member are respectively interchanged.

While the present invention has been described with respect to but a single preferred embodiment, it will be apparent that numerous modifications and variations are possible within the spirit and scope of the invention and thus it is not intended to limit the invention except by the terms of the following claims.

What is claimed is:

1. An aircraft mirror comprising a hollow closed streamlining body member open at one end, a hollow truncated hemispherical bearing member recessed coaxially within the open end of said body member, the outer hemispherical surface of said bearing member pivotally and rotatably engaging the inner surface of the open end of said body member, a hollow generally hemispherical shoe engaging the inner surface of said bearing member and extending through the truncated end thereof, an axial tie rod centrally secured to said shoe and extending through the closed end of said body member in loose fitting relationship therewith, an adjusting nut threadably secured to said tie rod and bearing against the closed end of said body member, a reflecting surface attached coaxially to said bearing member, and a transparent hollow hood element coaxially detachably connected to the open end of said body member.

2. An aircraft mirror as defined by claim 1 and further defined by said body member having an axially symmetric blunt nosed ellipsoid configuration, and said hood element having an axially symmetric point tapered boat tail configuration.

3. In a high winged aircraft having a wing supporting strut, a rear view miror comprising a hollow streamlined body member having an open trailing end and a truncated leading end terminated by a flat transverse end closure, said end closure having a central axial aperture therein, a hollow hemispherical bearing member disposed within the open trailing end of said body member and engaging the inner wall surface thereof to form a ball joint therewith, said bearing member truncated at its leading end to have a central axial opening therein, a hollow generally hemispherical shoe engaging the inner surface of said bearing member and extending partially through the open truncated end thereof, a tie rod centrally secured to said shoe and axially extending through the aperture of said end closure in loose fitting relationship therewith, an adjusting nut threadably engaging said tie rod and bearing against said end closure, a reflecting surface secured transversely to the trailing end of said bearing member, a hollow transparent streamlined hood element coaxially and detachably secured to the trailing end of said body member, and mounting means projecting from said body member and secured to said wing supporting strut at a location where said reflecting surface is readily observable from the pilot's position within the cockpit of said aircraft.

4. The device defined by claim 3 further defined by said body member, said bearing member, and said shoe being constructed of aluminum and said hood element being constructed of plexiglass.

5. The device defined by claim 3 further defined by said body member having an axially symmetric blunt nosed ellipsoid configuration and said hood element having an axially symmetric point tapered boat tail configuration for producing minimum drag at the average cruising velocities of said light aircraft.

6. A rear view mirror for mounting on light aircraft comprising a hollow body member constructed of light weight structural material and having an axially symmetric blunt nosed ellipsoidal configuration truncated at its leading end, said body member open at the trailing end and having a flat transverse centrally apertured end closure at the truncated leading end thereof, a hollow hemispherical bearing member constructed of light weight structural material and having a diameter slightly greater than the diameter of the open trailing end of said body member, said bearing member recessed into the trailing end of said body member to form a ball joint therewith and truncated at its leading end to have a central axial opening therein, a hollow generally hemispherical shoe constructed of light weight structural material and having an outer radius of curvature substantially equal to the inner radius of curvature of said bearing member, said shoe engaging the inner surface of said bearing member and partially extending through the open truncated end thereof, a tie rod centrally secured to said shoe and axially extending through the apertured end closure of said body member in loose fitting relationship therewith, an adjusting nut threadably secured to said tie rod and bearing against the end closure of said body member, said nut shaped to conform to the truncated apex of said body member, a transverse mounting plate coaxially secured to the trailing end of said bearing member to form an end closure therewith and having a central circular recess in the exterior face thereof, a circular mirror reflecting surface secured within said recess, a hollow hood element constructed of light weight transparent plastic material and having an axially symmetric point tapered boat tail configuration, said hood element detachably secured in coaxial relationship to the trailing end of said body member, and mounting means projecting from said body member for rigidly attaching said mirror to said aircraft at a location readily observable from the pilot's position within the cockpit of the aircraft.

References Cited in the file of this patent

UNITED STATES PATENTS

| | | |
|---|---|---|
| 1,877,109 | Wullenweber | Sept. 13, 1932 |
| 1,909,526 | Falge et al. | May 16, 1933 |
| 2,353,380 | Adler | July 11, 1944 |
| 2,375,134 | Ptacek | May 1, 1945 |
| 2,457,348 | Chambers | Dec. 28, 1948 |
| 2,534,135 | Lahr et al. | Dec. 12, 1950 |
| 2,629,286 | Budreck | Feb. 24, 1953 |
| 2,726,575 | Koonter | Dec. 13, 1955 |